United States Patent
Harvey et al.

(10) Patent No.: US 7,907,578 B2
(45) Date of Patent: Mar. 15, 2011

(54) FREQUENCY OVERLAY TECHNIQUE FOR A PICO CELL SYSTEM

(75) Inventors: Richard Lee Harvey, Branchburg, NJ (US); Sean Patrick Haynberg, Bridgewater, NJ (US); William Howard Stone, Jr., Doylestown, PA (US)

(73) Assignee: Cellco Partnership, Basking Ridge, NJ (US)

( * ) Notice: Subject to any disclaimer, the term of this patent is extended or adjusted under 35 U.S.C. 154(b) by 679 days.

(21) Appl. No.: 11/416,324

(22) Filed: May 3, 2006

(65) Prior Publication Data
US 2007/0258417 A1 Nov. 8, 2007

(51) Int. Cl.
*H04W 4/00* (2009.01)
(52) U.S. Cl. ........................................ 370/338
(58) Field of Classification Search ............... 370/338
See application file for complete search history.

(56) References Cited

U.S. PATENT DOCUMENTS

| | | | |
|---|---|---|---|
| 5,519,761 A | 5/1996 | Gilhousen | |
| 5,548,809 A * | 8/1996 | Lemson | 455/454 |
| 5,594,782 A | 1/1997 | Zicker et al. | |
| 5,818,827 A * | 10/1998 | Usui et al. | 370/344 |
| 5,857,155 A | 1/1999 | Hill et al. | |
| 6,314,286 B1 * | 11/2001 | Zicker | 455/431 |
| 6,321,090 B1 | 11/2001 | Soliman | |
| 6,788,935 B1 | 9/2004 | McKenna et al. | |
| 6,928,064 B2 * | 8/2005 | Proctor, Jr. | 370/335 |
| 2001/0001616 A1 * | 5/2001 | Rakib et al. | 375/259 |
| 2003/0013489 A1 | 1/2003 | Mar et al. | |
| 2004/0110520 A1 | 6/2004 | Barbara et al. | |
| 2004/0142658 A1 | 7/2004 | McKenna et al. | |
| 2006/0025131 A1 | 2/2006 | Adamany et al. | |
| 2006/0206246 A1 | 9/2006 | Walker | |

OTHER PUBLICATIONS

International Search Report and Written Opinion of the International Searching Authority, issued in International Patent Application No. PCT/US 07/20717, dated Mar. 18, 2008.
U.S. Appl. No. 11/543,230, filed Oct. 5, 2006.
U.S. Appl. No. 10/461,680, filed Jun. 16, 2003, Kevin Morehead, et al.
U.S. Appl. No. 09/655,541, filed Sep. 6, 2000, entitled Global Positioning System Based Booster Amplifier, and Rule 116 amendment thereof.
International Search Report, and Written Opinion of the International Searching Authority, issued in International Application No. PCT/US 06/46001, dated on Jul. 26, 2007.

(Continued)

*Primary Examiner* — Marivelisse Santiago-Cordero
*Assistant Examiner* — Munjal Patel
(74) *Attorney, Agent, or Firm* — McDermott Will & Emery LLP (57) ABSTRACT

To ameliorate interference between an indoor wireless pico cell system, for example in an aircraft, and public wireless communications systems operating in a surrounding or overflown area, frequencies of operation of the indoor system are coordinated with those used by the public wireless systems in the surrounding area. The pico cell system operates one type of service on all or a portion of a band used for a different type of service by the public system. In the aircraft example, a pico cell system might support GSM narrowband service and CDMA broadband service. The airborne GSM operations use a portion, e.g. corresponding to a guard band, of CDMA service spectrum in the terrestrial network. The airborne CDMA service uses a band used for GSM service by the terrestrial network. The pico cell system dynamically changes its frequency band(s), as the aircraft flies over different areas.

17 Claims, 2 Drawing Sheets

OTHER PUBLICATIONS

International Search Report and Written Opinion of the International Searching Authority, issued in International Patent Application No. PCT/US2006/046001, mailed Nov. 13, 2008.

International Search Report and Written Opinion of the International Searching Authority, issued in International Patent Application No. PCT/US2006/046001, mailed Jul. 26, 2007.

* cited by examiner

FREQUENCY OVERLAY TECHNIQUE FOR A PICO CELL SYSTEM

TECHNICAL FIELD

The present subject matter relates to techniques and equipment to mitigate interference between a pico cell type wireless communication system, e.g. in a moving vehicle such as an aircraft, and public mobile communication systems, such as narrowband and broadband wireless networks in the surrounding area such as on the ground over which the aircraft travels.

BACKGROUND

In recent years, mobile wireless communications have become increasingly popular. Initial implementations of mobile wireless communications, for example in the form of cellular telephone networks, supported circuit switched voice communication services. Today wireless carriers also offer packet data communication services to their mobile customers. A significant advantage of wireless communications is mobility, that is to say, the ability to communicate at virtually any location throughout a wide geographic area and/or while moving or roaming about that area. At the same time, the mobile communication devices, typically handsets or personal digital assistants (PDAs) or the like have become quite small, light and portable. As a result, subscribers to mobile wireless communication services routinely carry their mobile devices with them wherever they go and as they travel, including when they travel on commercial transport vehicles like buses, trains and airplanes.

Traditionally, the use of mobile communication devices on commercial transport vehicles has been limited or prohibited entirely. For example, on airplanes, in-flight use of such devices is prohibited, as the high power levels required to communicate with ground-based cell sites might interfere with aircraft navigational communications or other operations of the airplane.

Small-scale cellular wireless systems have been developed for indoor use, e.g. to provide wireless private branch exchange type services. US application publication no. 2003/0013489 to Mar et al., for example, discloses an IP-based technique for providing wireless communication services for an enterprise. Mobile devices communicate with pico cells when within the enterprise premises and with macro base stations of a public cellular network when outside the enterprise.

In general, a small scale or indoor cellular communication system may be referred to as a "pico cell" system, with the outdoor cellular communication system being referred to as a "macro-cell" system. Within such a system, each pico cell consists of a spectrally dynamic (frequency agile) base station provided within the aircraft. For example, the pico cell may include a scaled down cellular transceiver for GSM communication or a scaled down cellular transceiver for CDMA communication.

Recently, a number of parties involved in the wireless communication industry and/or the airline industry have proposed the use of pico cells to provide connectivity between a customer's handset and the pico cell within an airplane. U.S. Pat. No. 6,314,286 to Zicker, for example, proposes a miniature cellular network for use in an airplane, including internal base stations and an air-to ground communication link. The advantage of a pico cell type system in the vehicle is that customers can use their own mobile station equipment on the plane or other vehicle. Also, the mobile handsets or the like can be operated at very low power, reducing interference they might otherwise cause at ground base-stations and/or with aviations systems of the airplane.

In a typical system now being proposed for vehicle applications, there will be at least one GSM transceiver and at least one CDMA transceiver. The two transceivers may form two pico base stations or may be integrated into a single pico base station.

A problem with such a pico cell approach in airplanes is that the transmissions from the airborne system and the mobile devices in the airplane interfere with the reception of customers' handsets in use on the ground. For example, signals from airborne handsets would also be received at ground base-stations. Although the airborne handset operations are at reduced power levels, the path between the aircraft and ground base-stations is unobstructed. Theoretically, the aircraft could be redesigned to reduce leakage, e.g. by adding shielding to the aircraft windows and to the passenger compartment. However, any solution involving extensive modification of the aircraft would be expensive and difficult or impossible to adapt to aircraft that are already in service.

Similar interference problems with regard to public network base station communications may arise in other vehicle or indoor applications of pico cell systems. Hence, a need exists for a technique to minimize the impact of interference between wireless station communications with the pico cell system and external public wireless networks. For vehicle applications, such as in airplanes, the solution should not require extensive modification or upgrade to the vehicle.

SUMMARY

The teachings herein ameliorate problems of interference between an indoor pico cell system and one or more public wireless communications systems operating in a surrounding region, by coordinating frequencies of operation of the indoor pico cell system with those used for by the public wireless communications system (or systems) operating in the surrounding region. Typically, an indoor system will utilize a frequency overlay onto at least a portion of one or more frequency bands utilized for different protocol or technology type service or services for wireless communications in the public mobile network operating in the surrounding outdoor region. Aspects of these teachings may be embodied in methods of operating pico cell systems, pico cell systems or software for controlling operation of such systems.

A disclosed method of providing wireless communications involves operating a pico cell system, to provide two-way wireless communication over a wireless link for one or more mobile devices within an indoor service area, in accord with a first public wireless communication protocol. Typically, these communications are coupled to and from a public communication network. The method also entails mitigating interference between the two-way wireless communication in the indoor service area and wireless communication in accord with the same public wireless communication protocol, that may be provided by a public mobile communication network operating in a surrounding outdoor region. The interference mitigation involves controlling the pico cell system to operate on a frequency band corresponding to at least a portion of a frequency band allocated for mobile wireless communication in accord with a second public wireless communication protocol via a public mobile communication network operating in the surrounding outdoor region. The second public wireless communication protocol is different from the first public wireless communication protocol.

The first public wireless communication protocol may be a narrowband protocol, in which case, the second public wireless communication protocol is a broadband protocol. In several such examples, the pico cell system operates on a frequency band corresponding to a guard band portion of the frequency band allocated for broadband mobile wireless communication in the surrounding outdoor region.

As another example, the first public wireless communication protocol may be a broadband protocol, in which case, the second public wireless communication protocol is a narrowband protocol.

The present disclosure also proposes dynamic frequency control, e.g. for vehicle applications. For such applications, the system control step also involves dynamically changing the frequency band of operation of the pico cell system, so as to correspond to at least a portion of a different frequency band allocated for mobile wireless communication in accord with the second public wireless communication protocol, in response to movement of the pico cell system into a different surrounding outdoor region, e.g. as the vehicle moves from region to region.

The present teachings also encompass a pico cell system for use in an indoor service area to provide wireless communications. Such a system includes one or more base stations configured for providing mobile wireless communication with a mobile station operating within the indoor service area, and a controller for controlling wireless operations of the base station(s). The system would also include a communication interface coupled to the one or more base stations, for providing two-way communications to and from a public communication network. In such a system, the one or more base stations provide the mobile wireless communication service in accord with a first public wireless communication protocol within the indoor service area. To that end, the base station(s) use a frequency band corresponding to at least a portion of a frequency band allocated for mobile wireless communication in accord with a different second public wireless communication protocol, which may be offered via a public mobile communication network operating in a surrounding outdoor region.

An overlay technique of a type discussed herein may be implemented in a system that provides a single type of wireless communication in the indoor area. In such a case, the indoor operations in accord with one protocol are overlaid on at least a portion of the spectrum allocation for a different protocol service of the public wireless network. Examples discussed in detail below utilize a two-way overlay, in which broadband indoor communications utilize spectrum assigned for outdoor narrowband communications and narrowband indoor communications utilize spectrum assigned for outdoor broadband service.

A method of operating a pico cell system in an indoor service area provides wireless communications for narrowband and broadband mobile stations. The system is controlled to provide the narrowband wireless communication service, for one or more narrowband mobile devices within the indoor service area, on a first frequency band. This first band corresponds to at least a portion of a frequency band allocated for broadband wireless service via a public mobile communication network operating in a surrounding outdoor region. The system is controlled to provide the broadband wireless service, for one or more broadband mobile devices within the indoor service area, on a second frequency band. This second band corresponds to at least a portion of a frequency band allocated for narrowband wireless service via a public mobile communication network operating in the surrounding outdoor region.

Although the pico cell system may be implemented at a fixed location, e.g. in a building or on a campus, many applications relate to moving vehicles, such as airplanes or other types of aircraft. Hence, system operation often involves dynamically changing one or both of the frequency bands based on position of the moving vehicle. In such applications, the dynamic changing of frequency is responsive to a determination of a change of position of the moving vehicle into the different surrounding outdoor region, e.g. upon transition as an aircraft flies from one service area to another.

The technique for coordinating pico cell frequencies of operations with bands of operation of surrounding public systems may be applied to a variety of known wireless services that utilize various cellular or PCS spectrum in various geographic regions or countries. Specific examples are disclosed in which narrowband communications utilize GSM whereas broadband communications utilize CDMA. In such an example, the GSM operations of the pico cell system may utilize spectrum corresponding to guard bands of the public CDMA service in the surrounding area.

As noted, pico cell systems also are disclosed for use in an indoor service area to provide wireless communications for narrowband and broadband mobile stations. Such a system might include one or more base stations configured for narrowband and broadband communication with narrowband and broadband mobile stations within the indoor service area, and a controller for controlling wireless operations of the system. The system would also include a communication interface coupled to the one or more base stations for providing two-way communications to and from a public communication network. In such a system, the base station controller controls operations of the one or more base stations so as to provide narrowband wireless communication service devices within the indoor service area on a first frequency band and to provide broadband wireless service within the indoor service area on a second frequency band. The first band corresponds to at least a portion of a frequency band allocated for broadband wireless service via a public mobile communication network operating in a surrounding outdoor region. The second band corresponds to at least a portion of a frequency band allocated for narrowband wireless service via a public mobile communication network operating in the surrounding outdoor region.

In a specific example, the one or more base stations provide GSM type narrowband communication service within the indoor service area and provide CDMA type broadband communication service within the indoor service area. The first frequency band corresponds to a guard band of a CDMA service operating in the surrounding outdoor region. The second frequency band corresponds to a frequency band assigned to a GSM service operating in the surrounding outdoor region. The base station controller also communicates with CDMA and GSM mobile stations when operating within the indoor service area, so to dynamically control transmission power levels and operating frequencies of the CDMA and GSM mobile stations operating within the indoor service area. In a moving vehicle application, for example, the base station controller is configured to control operations of the one or more base stations so as to dynamically change the first and second frequency bands based on position of the moving vehicle, e.g. as the aircraft flies over different terrestrial service regions.

As noted, program products also are disclosed. Such a product comprises a machine readable medium and executable code embodied on the medium. Execution of the code by a programmable base station controller of a pico cell system, operating in an indoor service area, will cause the controller to control operations of the pico cell system to provide wireless communications for narrowband and broadband mobile stations in the indoor service area. The controlled operations include operating the pico cell system to provide narrowband wireless communication service for one or more narrowband mobile devices within the indoor service area, on a first frequency band. This band corresponds to at least a portion of a frequency band allocated for broadband wireless service via a public mobile communication network operating in a surrounding outdoor region. The controlled operations further include operating the pico cell system to provide broadband wireless service for one or more broadband mobile devices within the indoor service area, on a second frequency band. The second band corresponds to at least a portion of a frequency band allocated for narrowband wireless service via a public mobile communication network operating in the surrounding outdoor region.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

In accord with the discussion below, an indoor system will utilize a frequency overlay onto at least a portion of one or more frequency bands utilized for different protocol or technology type service or services for wireless communications in a public mobile network operating in the surrounding outdoor region. The precise overlay scheme is chosen to mitigate interference issues. The overlay technique may be implemented in a system that provides a single type of wireless communication in the indoor area. For example, indoor GSM communications (narrowband) may utilize a portion of guard band of a CDMA or UMTS service (broadband) provided by an outdoor network. As another example, indoor CDMA service may utilize spectrum allocated for GSM or TDMA (narrowband) in the outdoor network. If the outdoor service is UMTS, then CDMA is relatively narrow in bandwidth, and the indoor CDMA service might utilize spectrum allocated for outdoor UMTS operations. Examples discussed in detail below utilize a two-way overlay, in which broadband indoor communications utilize spectrum assigned for outdoor narrowband communications and narrowband indoor communications utilize spectrum assigned for outdoor broadband service.

Such an exemplary indoor system will typically support service for two or more of the common types of mobile stations, one broadband and one narrowband, so as to provide indoor service for as many customers (having as many different mobile stations) as commercially practical. For US service, for example, the system might support CDMA service and GSM and/or TDMA type services. The public networks in the regions where the indoor system is located or passes over/through will offer similar broadband and narrowband services. As discussed in the detailed examples below, the indoor system operates in such a manner as to provide a frequency overlay of each of its services on all or a portion of a frequency band that the public network(s) uses for a different one of the service types. In the broadband/narrowband indoor system example, the broadband service through the indoor system uses at least a portion of what would be narrowband frequency spectrum in the public network, and the narrowband service through the indoor system uses at least a portion of what would be broadband frequency spectrum in the public network.

In an airborne pico cell system for an aircraft, a pico cell transceiver of the system provides a wireless link between each customer's handset or other mobile device and the pico cell system. Another radio link would connect from the pico cell system to the ground. That air-to-ground link could be satellite, cellular, PCS or via special air-to ground frequencies. The frequencies in use by the pico cell for the handset to pico cell links are coordinated with spectrum use in the over-flown terrestrial system. The radio spectrum used is the same as spectrum licensed to over-flown terrestrial cellular and/or PCS systems, however the precise frequencies used are to be coordinated with the terrestrial system to minimize interference so that each technology operating within the aircraft uses spectrum normally associated with the a different type of service on the ground. GPS or another location system would allow a controller to adjust the channels used (within the aircraft) by location. Calls are handed over to different radio channels as required at licensed boundaries. Actual implementation may involve coordination with multiple licensees to further minimize the interference. This is possible since airborne planes are always located some distance from terrestrial base-stations. Using that factor, the techniques discussed below, for example, allow the coordinated use of frequencies used for CDMA on the ground for GSM service in the pico cell system and the use of frequencies that are used for GSM on the ground for CDMA service in the pico cell system.

Of course, the techniques discussed here for the airborne system also may be applied in fixed or terrestrial indoor systems in a building or campus. For example, although such a terrestrial indoor system often will be somewhat closer to a public cell site than say a high flying aircraft, the building housing the system may provide more shielding that is found in the aircraft. The overlay techniques then can provide further interference reduction.

Figure 1:
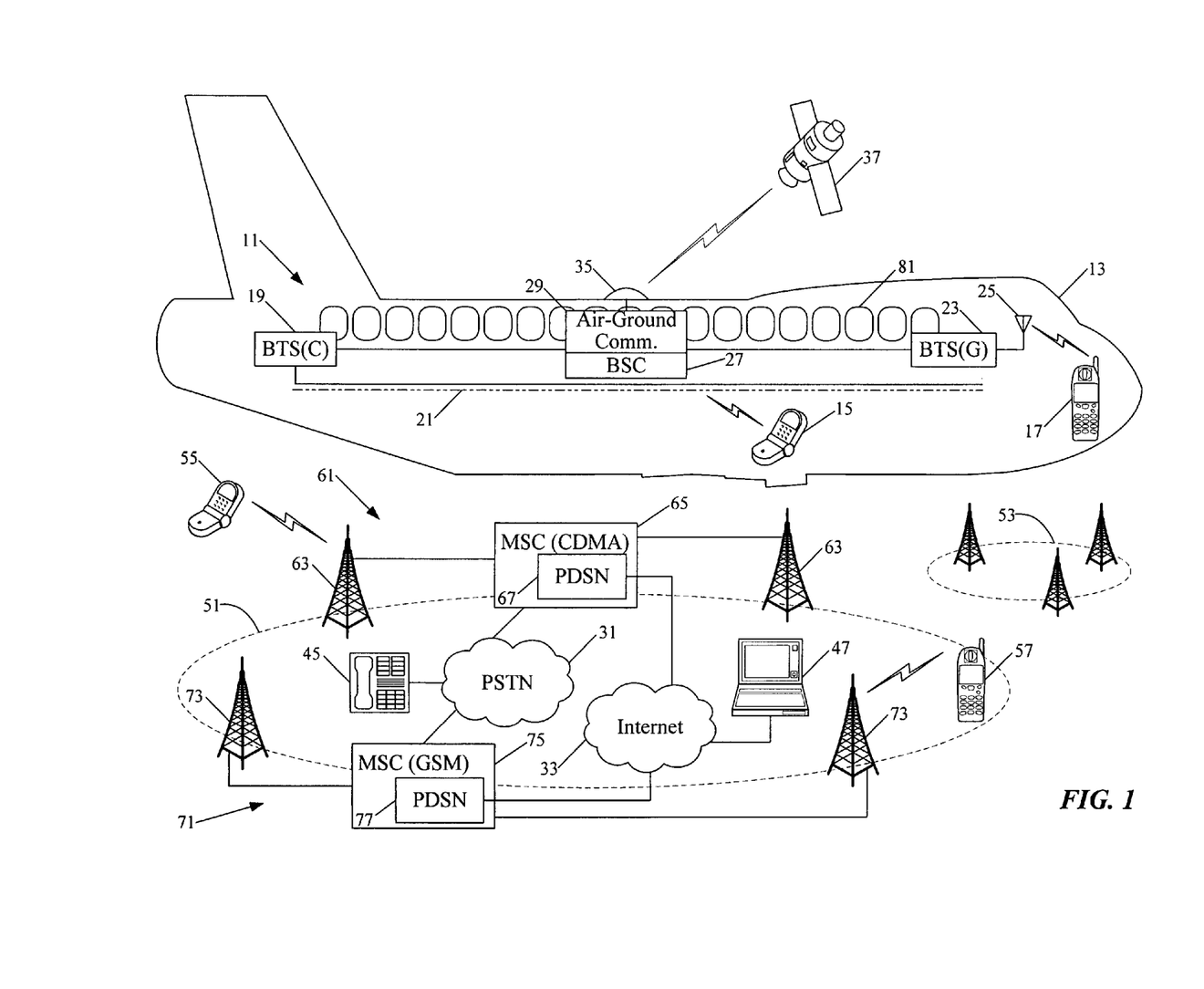
FIG. 1 is a functional block diagram illustrating an example of a pico cell wireless communication system implemented in an airplane and wireless communication networks in one or more regions over-flown by the airplane.

Reference now is made in detail to the examples illustrated in the accompanying drawings and discussed below. An indoor system or pico cell system operates within a territory or geographic area in which public wireless networks offer services on different frequency bands using different protocols. Although applicable to fixed indoor installations as well as ground or water borne transport vehicles, FIG. 1 depicts functional elements of a simple example of an airborne pico cell system 11. The drawing also depicts functional elements of public wireless networks in surrounding regions overflown by the aircraft 13. As noted, the teachings herein art applicable to indoor systems providing a single type or protocol for the indoor wireless communications as well as to indoor systems providing two or more different types of services. The illustrated example provides two types of wireless communication service, one broadband and one narrowband, with each type of service overlaid on spectrum used by the other in the outdoor network(s) operating in the surrounding region.

A small scale or indoor cellular communication system may be referred to as a "pico cell" system 11, with each outdoor or public cellular communication system being referred to as a "macro-cell" system. Within the system 11, each pico cell consists of a spectrally dynamic (frequency agile) base station provided within the aircraft 13. The pico cell systems 11, for example, include one or more scaled down cellular transceivers for GSM or other narrowband communication and a scaled down cellular transceiver for CDMA or other type of broadband communication. As discussed more below, the two transceivers may form two pico base stations as shown or may be integrated into a single pico base station.

In the illustrated example, the pico cell system 11 is for use in a moving vehicle. Although such a system 11 could be utilized in other types of vehicle, such as a bus or a train or any of a variety of different aircraft types, in the example, the system 11 provides wireless service inside an airplane 13. In such an application, the indoor service area covered by the pico cell system 11 encompasses at least the passenger compartment and may include the crew cabin/bridge and other areas within the vehicle 13. The pico cell system 11 provides wireless communications within the indoor service area, for one or more narrowband mobile stations 15 and one or more broadband mobile stations 17 used by passengers of crew members.

The pico cell system includes one or more base stations (BSs) supporting narrowband and broadband communications with narrowband and broadband mobile stations (MSs) within the indoor service area. In the illustrated example, the system 11 within the airplane 13 includes two base stations.

A base transceiver system (BTS) 19 and associated antenna 21 form a first base station, for providing wireless service for compatible mobile stations 15 operating in the indoor service area inside the airplane 13. A BTS is the part of a radio network that sends and receives signals via the associated antenna over the air to/from the compatible mobile stations that the base station currently serves. The BTS 19 provides two-way communication over the air to the compatible mobile station(s) 15 in accord with an applicable broadband spectrum, that is to say a standard utilizing a relatively broad frequency band for each communication. The principles under discussion here are applicable to a number of different types of broadband wireless communications network technologies. In the example, the broadband air-link communications between the BTS(C) 19 and the mobile station(s) 15 utilize code-division multiple access (CDMA) type spread spectrum communications. For example, the system might operate in accord with the IS-95 standard, or a next generation wireless network implementation might operate in accord with 3rd Generation Partnership Project 2 (3GPP2) wireless IP network standard or the Evolution Data Only (EVDO) standard.

A BTS 23 and associated antenna 25 form a second base station, which provides wireless service which utilizes a narrower frequency range for each call to and from any compatible mobile stations 17 operating in the indoor service area inside the airplane 13. The BTS 23 for the narrowband service provides two-way communication over the air to the compatible mobile station(s) 17 in accord with an applicable narrowband standard, that is to say, a standard utilizing a relatively smaller frequency band for each communication than for the broadband communications. The principles under discussion here are applicable to a number of different types of narrowband wireless communications network technologies. In the example, the narrowband air-link communications between the BTS(G) 23 and the mobile station(s) 17 utilize Global System for Mobile (GSM) communication, although system 11 may support time division multiple access (TDMA) or other narrower bandwidth standards.

Those skilled in the art will recognize that the base station elements may be combined into a signal station providing both CDMA and GSM operations. Also, whether using separate base stations or one or more integral base stations, the pico cell system 11 may provide service in accordance with one or more additional public wireless standards.

The antennas 21 and/or 25 may be any available type convenient for providing wireless communications over the desired interior space of the airplane 13. Both antennas may be similar, or the two types of communication may use different types of antennas. In the example, the first base station antenna 21 that sends and receives CDMA formatted wireless signals is a leaky coaxial cable type antenna, whereas the second base station antenna 25 that sends and receives GSM formatted wireless signals is an omni-directional antenna or a panel type antenna. Those skilled in the art will recognize that the pico cell system 11 may utilize a single antenna for the two or more types of wireless communications within the airplane 13.

The pico cell system 11 also includes a controller for controlling wireless operations of the one or more base station. In the exemplary system 11 for an aircraft 13, the controller takes the form of a base station controller (BSC) 27. The BSC 27 controls the functions of a number of base stations 19, 23, and in a pico cell system 11, the BSC 27 helps to manage communications through the system, e.g. to authenticate mobile devices and set-up calls or sessions with the public network 31 or 33. Of note for purposes of this discussion, the BSC 27 implements control over the frequencies of operation of the one or more base stations 19, 23 of the indoor or pico cell system 11 to provide the desired overlay of operation frequencies on spectrum allocated to public terrestrial services in regions overflown by the airplane 13.

The BSC 27 controls the BTS(C) 19 so that the broadband base station provides broadband wireless service for one or more broadband mobile devices 15 operating inside the airplane 13, on a frequency band corresponding to a frequency band allocated for narrowband wireless service via a public mobile communication network operating in the surrounding outdoor region. The BSC 27 controls the BTS(G) 23 so that the narrowband base station provides narrowband wireless communication service for one or more narrowband mobile devices 17 operating inside the airplane 13, on a frequency band corresponding to a frequency band allocated for broadband wireless service via a public mobile communication network operating in the surrounding outdoor region.

The pico cell system 11 also includes an air-to-ground communication interface 29 coupled to the one or more base stations 19, 23, for providing two-way communications to and from a public communication network. Examples of the public network include the public switched telephone network (PSTN) 31 and the public Internet 33. The link to the public network(s) on the ground could use cellular, PCS or special air-to ground frequencies. In the example, this link is a satellite link, hence, the air-to-ground communication interface 29 connects to an antenna 35 for two-way mobile communication with a satellite 37. The link from the satellite 37 to the terrestrial network(s) is omitted for convenience, as it may be conventional in nature.

The pico cell system 11 thus enables users of the mobile stations 15, 17 within the airplane 13 to initiate and receive telephone calls with each other, with mobile stations such as 55 and 57 that are operating through the terrestrial public wireless networks and/or through the public switched telephone network (PSTN) 31, for example for communications with landline telephone devices 45. Preferably, the pico cell system 11 also offers packet switched data communication services. In such an implementation, the system 11 enables users of the mobile stations 15, 17 to initiate and receive packet data sessions for communication with various packet switched data communications equipment, for example to or via Internet 33. These packet data services may allow communications with other networks such as private intranets (not shown). The packet data communications allow users of the mobile stations 15, 17 to send to or receive data from other digital devices that otherwise have access to the Internet 33, represented generically by the PC 47, although obviously such correspondent data devices may be servers, host computers, personal computers and/or other mobile stations.

The frequencies in use by the pico cell system 11, for the mobile to pico cell base station link(s) are coordinated with spectrum use in the public wireless system in the surrounding area. In the airplane example, pico cell operations frequencies are coordinated with spectrum use in the public wireless terrestrial systems in regions that the airplane 13 flies over. To fully appreciate this coordination, it may be helpful to consider simplified examples of the terrestrial systems.

In the example, the airplane 13 is presently over a region 51 in which carriers offer CDMA type broadband service and GSM type narrowband service, although the terrestrial services in any given region may be different or different in number. As the airplane travels, it will pass from the surrounding outdoor region 51 into another surrounding outdoor region 53. Public wireless networks in the second region 53 may be similar to those operated in the region 51, although examples are discussed later in which the frequency ranges or bands allocated to the broadband and narrowband services differ in the two different regions. However, since the network equipment may be generally similar, discussion of the terrestrial wireless equipment will focus on that in the region 51.

The public wireless communication networks in region 51 provide mobile voice telephone communications as well as packet data services, for numerous mobile stations, in accord with at least two different wireless protocols. For purposes of later discussion, the drawing shows two mobile stations 55 and 57 operating in the region 51. The mobile station 55 represents a broadband mobile station, e.g. a CDMA station similar to the mobile station 15. The mobile station 57 represents a narrowband mobile station, e.g. a TDMA or AMPS station, or in the example, a GSM station similar to the mobile station 17.

In the example, a first carrier operates a broadband type wireless network 61, in this case a CDMA type network. The present concepts are applicable to a variety of different broadband public wireless technologies supporting voice and/or packet data communications services, such as IS-95, 1xRTT, UMTS and EVDO. For purposes of discussion only, the network 61 represents an EVDO type network or a 1xRTT type network. The CDMA type wireless communication network 61 provides mobile voice telephone communications as well as packet data services, for numerous CDMA compatible mobile stations 55, although for ease of illustration and discussion, only one mobile station 55 appears in the drawing. In an EVDO implementation, the all packet network would support telephone type services using Voice over IP (VoIP) type communications, although associated server components are omitted for convenience. In a 1xRTT implementation, the system would carry voice communications as separate circuit switched communications.

The network 61 enables users of the CDMA mobile stations 55 to initiate and receive telephone calls to each other as well as through the public switched telephone network (PSTN) 31, for example for communications with landline telephone devices 45 or mobile stations within the airplane 13. The network 61 also enables users of the mobile stations 55 to initiate and receive various data communications, for example, through the public Internet 33 with data equipment represented generically by the PC 47.

The broadband wireless network 61 includes elements forming a macro area radio access network (RAN). These elements typically include a number of base stations represented in the example by the respective base station (BS) antenna towers 63. Each base station typically includes a base transceiver system (BTS), which communicates via an antenna system 63 at the site of base station and the air-link with one or more of the mobile stations 55, when the mobile stations are within range. The BTS is the part of the radio network that sends and receives radio frequency (RF) signals to/from the mobile stations that the base station currently serves. For convenience, the BTSs are omitted from the illustration of the network 61, as they are conventional in nature.

The network 61 also includes a traffic network, which carries the user communications for the mobile stations 55. The traffic network includes a mobile switching center (MSC) 65, which includes or is in communication with a packet data serving node (PDSN) 67. In a 1xRTT implementation, the MSC 65 may be a modern version of a circuit switched mobile telephone switch, which supports both cellular voice and packet data services. Each such switch connects through trunk circuits (not shown) to a number of the BTS base station transceivers at base stations 63, which the respective switch serves and controls. In an EVDO (evolution data only) implementation, the traffic network is a high-speed packet switched data network, and the MSC 65 comprises a packet switch/router connected to the BTSs at base stations 63.

The network 61 typically includes a base station controller (BSC) functionality that controls the functions of a number of base stations and helps to manage how calls made by each mobile station 55 are transferred (or "handed-off") from one serving base station to another. Each wireless network equipment vendor implements this function differently. Some vendors have a physical entity, which they call a BSC, while other vendors include this functionality as part of their MSC 65.

As noted, the network 61 also includes one or more PDSNs 67 coupled to the MSC 65. The PDSN is a fixed network element introduced in the architectures for third generation wireless networks, to support packet-switched data services. Each PDSN 67 establishes, maintains and terminates logical links to the associated radio access network portion of the broadband network 61. The PDSNs 67 also support point-to-point (PPP) user data sessions with the mobile stations 55. The PDSNs 67 provide the packet routing function from the radio network to/from other packet switched networks, represented generally by the public Internet 33, in the drawing. The PDSN 67 also provides related validation and billing functions, typically via interaction with an authentication, authorization and accounting (AAA) server (not shown).

In the example, a second carrier operates a narrowband type wireless network 71, in this case a GSM type network. The present concepts are applicable to a variety of different narrowband wireless technologies supporting voice and/or packet data communications services, such as TDMA, GPRS or GSM. For purposes of discussion only, the network 71 represents a GSM type network. The GSM type wireless communication network 71 provides mobile voice telephone communications as well as packet data services, for numerous GSM compatible mobile stations 57, although for ease of illustration and discussion, only one mobile station 57 appears in the drawing.

The network 71 enables users of the GSM mobile stations 57 to initiate and receive telephone calls to each other as well as through the public switched telephone network (PSTN) 31, for example for communications with landline telephone devices 45 and mobile stations in the airplane 13. The network 71 also enables users of the mobile stations 57 to initiate and receive various data communications, for example, through the public Internet 33 with data equipment represented generically by the PC 47.

Although different radio access networks may utilize different technologies or architectures, for discussion purposes it is assumed that the narrowband network 71 is generally similar to the network 61 except that the network 71 implements a narrowband protocol such as GSM over the airlink to the mobile stations 57 on a different public network frequency band. Like the network 61, the physical elements of the radio access network (RAN) portion of the network 71, include a number of macro area base stations represented in the example by the base station antenna towers 73. Each base station 73 typically includes a BTS (not separately shown), which communicates via an antenna system at the site of base station and the air-link with one or more of the mobile stations 57, when the mobile stations are within range.

The network 71 also includes a traffic network, represented by the MSC 65, which includes or is in communication with a packet data serving node (PDSN) 67. The traffic network carries the user communications for the mobile stations 57. As in the network 61, the MSC 75 may be a modern version of a circuit switched mobile telephone switch supporting both cellular voice and packet data services, or the MSC 75 may comprise a packet switch/router. The network 71 also includes a number of Packet Data Serving Nodes or "PDSNs" 77 coupled to the MSC 75. The PDSN 77 performs functions similar to those of the PDSN 67 in the network 61, to provide packet switched routing services and related validation and billing functions.

In the example of FIG. 1, each of the mobile stations in the airplane and in the terrestrial regions 51, 53, for example, may take the form of a mobile telephone station, which may be enhanced with display and user input capabilities to support text and image communications, such as e-mail, picture communication and web browsing applications. Today, such mobile telephones typically take the form of portable handsets, as shown in the drawing, although they may be implemented in other form factors, such as personal digital assistants (PDAs) or handheld or laptop personal computers (PCs) incorporating or connecting to a wireless transceiver compatible with at lest one type of wireless communication service offered by the pico cell system 10 and one of the terrestrial wireless networks. Of course, the mobile stations may take other forms or connect to a variety of other voice or data devices that may enable use of the network communication services.

In the example, each of the terrestrial public wireless networks 61, 71 in the region 51 supports a range of packet data services and/or circuit switched voice services for mobile users of stations 55, 57 and parties communicating with those users. The packet data communications can support traditional data applications, such as browsing the Internet 33 and email or instant messaging with mobile stations or with remote computers represented generally by the personal computer (PC) 47. The packet data communications may also support Voice over IP (VoIP) type packet applications, e.g. as an alternative or in addition to circuit switched service for voice telephone calls.

Those skilled in the art will also recognize that the geographic or geometric relationships illustrated in the drawing are intended to be stylized and not particularly accurate or proportionate. For example, a region 51 or 53 may be any shape or size and is typically much larger than the indoor region served by the pico cell system 11 and thus may be said to "surround" the service area of the pico cell system as the airplane flies over regions 51 and 53, although at times, the indoor and outdoor regions may overlap various boundaries. For some services, the area for a broadband service may not be the same as that for narrowband service. Also, the public networks represented by PSTN 31 and Internet 33 may overlap or extend into a region 51 or 53 but will not be entirely within any one region. Also, the terrestrial stations 45, 47 with which the airborne mobile stations 15, 17 and the ground operating mobile stations 55, 57 communicate may be within the region 51 or at any other location that may have access to the appropriate network 31 or 33.

Within region 51, the terrestrial public wireless networks 61 and 71 operate on different government allocated bands of the radio frequency spectrum. In the US, for example, there are cellular bands designated as A and B bands, as well as 1-6 bands allocated for PCS service. Assume for purposes of discussing an example that a carrier operates broadband service for stations 55 (and 15 when the user is on the ground) on an assigned A or B cellular band in region 51. Although that broadband carrier typically provides the service on the same band in some other regions, the carrier in the example operates its broadband service on the opposite one of the cellular bands or on an assigned one of the PCS bands in another region 53. Similarly, for discussion purposes, we will assume that a second carrier operates GSM or other narrowband service for stations 57 (and 17 when the user is on the ground) on the other one of the A and B cellular bands or on an assigned one of the PCS bands, in region 51. Although that narrowband carrier typically provides the service on the same band in some other regions, the second carrier in the example operates its narrowband service on a different allocated band (cellular or PCS) in the other region 53. Those skilled in the art will recognize that the interference mitigation approaches discussed below, involving using guard or partially used pieces of spectrum bands, are applicable to other bands including but not limited to the commercial 700 MHz band, PCS G, H & Blocks, AWS Bands, Part 27 Bands, and Part 90 SMR bands, as well as other bands that may be allocated in the future and/or in other countries.

Wireless communications inside the airplane 13, between mobile devices 15, 17 and the pico cell BTS transceivers 19 and 23, may interfere with wireless operations of the terrestrial networks 61 and 71, for example, because radio frequency (RF) signals from within the airplane 13 leak out through the windows 81 and other portions of the air frame.

Also, wireless communications in over-flown region 51, between mobile devices 55, 57 and the terrestrial base stations 63 and 73, may interfere with wireless operations of the pico cell network 11 inside the airplane 13. To mitigate one or more of the interference problems between the airborne system and the ground networks, the frequencies in use by the pico cell system 11 for the handset to pico cell link are coordinated with spectrum use in the over-flown terrestrial systems. The airborne pico cell system 11 operates its base station transceiver (BTS) 19 so that the broadband communications inside the airplane 13 use a frequency band corresponding to at least a portion of what would be narrowband frequency spectrum in the public GSM network 71 in the terrestrial region 51 and operates the BTS 23 so that narrowband communications inside the airplane 13 use a frequency band corresponding to at least a portion of what would be broadband frequency spectrum in the public CDMA network 61 in the terrestrial region 51.

However, this frequency relationship between air and ground operations often will change as the airplane 13 passes from one region 51 to another region 53. Hence, the BSC 27 dynamically controls BTSs 19 and 23 to change their frequencies to maintain the desired non-interfering frequency overlay. This operation requires the BSC 27 to implement frequency control based on relative location of the vehicle, that is to say the airplane 13 in our example. A number of techniques may be implemented. GPS or another location system would allow the BSC 27 to adjust the channels used (within the airplane 13) by location 51, or 53. Calls are handed over to different radio channels within the airplane 13 as required at licensed boundaries.

Actual implementation may involve coordination with multiple licensees to further minimize the interference. This is possible since airborne planes are always located some distance from terrestrial base-stations, such as 63 and 73. In aircraft applications, it is expected that the Federal Communications Commission in the US may not allow operation of a pico cell type system 11, except while the aircraft is at or above 10,000 feet in altitude. Using that factor, the techniques discussed below, for example, allow the coordinated use of frequencies used for CDMA on the ground for GSM in the pico cell system 11 and the use of frequencies that are used for GSM for CDMA in the pico cell system.

In cases where the terrestrial PCS operator is using CDMA technology, the channel assignment method would use the CDMA Guard Bands for narrowband airborne handset technologies such as GSM. For example, an airborne GSM handset 17 using the first or last channel in a PCS block (center frequency of 200 kHz from the band edge), or centered on the frequency between PCS blocks, would be within the guard band channels for standard CDMA channel assignments in the PCS band for a terrestrial system 61, which are 625 kHz from the band edge. For this case, the edge of the GSM channel would be separated at least 325 kHz from the edge of the CDMA channel. The airborne GSM handset 17 would not be co-channel with the CDMA terrestrial operations of base stations 63, and would not be co-channel with GSM terrestrial operations of base stations 73 if using the frequency centered between PCS blocks. The Guard bands normally remain unused in the terrestrial network 61 due to the interference created to the adjacent band channels. But in the case of airborne use, the additional attenuation and low power used allow for use of these frequencies. In a test performed at CDMA base stations on the CDMA guard band channels, about 12 dB of isolation was observed in these tests, as compared to the interference levels that were co-channel and within the CDMA 1.25 MHz channel.

Alternately, airborne GSM handsets could use the band edge frequency in use in the over-flown terrestrial GSM system (i.e. 0 kHz from the band edge, assigned as GSM guard band channel), which would provide additional interference protection for ground based GSM networks 71 that do not use this channel.

The following table 1 shows GSM Channel Assignments for PCS D Band.

TABLE 1

| Ch # | Tx | Rx | GSM Channel type |
|---|---|---|---|
| 586 | 1945.0 | 1865.0 | Guard band channel |
| 587 | 1945.2 | 1865.2 | Reduced power channel |
| 588 | 1945.4 | 1865.4 | Full power channel |

Channel 586 is at the BTS Tx center frequency 1945.0 MHz, which is centered on the band edge (between PCS blocks A & D).

For the case where CDMA signals are used in the pico cell to handset signals, the frequencies used could also be the same frequencies that are used for GSM in the terrestrial network. This is possible since CDMA signals received at GSM base stations will be reduced by 8 dB due to the narrower bandwidth employed by GSM (200 kHz vs. 1.25 MHz). Alternatively, The CDMA frequencies assigned could overlay the CDMA guard band and also part of the GSM terrestrial system spectrum. Airborne handsets may need updated frequency search lists to acquire and use the guard band channels, or be directed to use those channels by the onboard pico cell system 11. This provides greater level of protection from interference for CDMA ground networks that are not using CDMA guard band channels. Therefore, the CDMA signals operating on the CDMA guard band would receive at least 8 dB of isolation (attenuation) to CDMA and GSM ground networks. This would be sufficient to permit a CDMA PCS handset operation at 0 dBm EIRP above 10,000 feet for two aircraft within view of a GSM or CDMA base station, while maintaining the receiver interference level to below −120 dBm. Similarly, it would be sufficient for one aircraft within view of the base stations for a 737 aircraft that shows about 4 dB path gain through the airplane cabin for one co-channel handset used at the window seat. More handsets could be used if the power were reduced further or if other channels are used.

The channels utilized would change depending on the location of the aircraft and the licensed service area boundaries. Calls in process would be switched to new channels, if necessary, which would change the channels used by the pico cell to handset link. To a handset 15 or 17 involved in an ongoing call at the time of a boundary crossing, the frequency switching of the communication channel(s) looks like a hard handoff or hand over, although there is no handoff between cell sites or base stations.

The method described reduces the instance of interference between airborne callers and terrestrial callers. The frequency switching simulated "handoff" technique keeps the pico cell operations on channels that have been coordinated with the over-flown terrestrial systems and are either assigned or leased to the pico cell operator. In the specific example, the GSM pico deployment uses frequencies overlaid onto CDMA terrestrial deployments (in CDMA guard bands) and the CDMA pico cell deployment uses frequencies overlaid onto GSM terrestrial spectrum.

The example of FIG. 1 focused on dual overlay, that is to say overlay of airborne GSM on terrestrial CDMA guard bands in combination with overlay of airborne CDMA on terrestrial GSM spectrum frequencies. However, those skilled in the art will recognize that frequency overlay to mitigate interference can utilize other types of overlay arrangements. A few examples of applicable overlay schemes, for one or more pico cell bands in the indoor system, are listed in Table 2 below and of course may be used in various combinations in pico cell systems supporting two or more technologies.

TABLE 2

| Ex. # | Airborne | Ground Network | Improvement/ Isolation |
|---|---|---|---|
| 1 | GSM | on CDMA or UTMS Guard Band channels | greater than 12 dB |
| 2 | CDMA | on Overlay on GSM channels | 8 dB (ratio of BWs) |
| 3 | CDMA | on UMTS Guard Band channels | greater than 8 dB |
| 4 | UMTS | on Overlay on GSM, or CDMA channels | 12.9, or 4.9 dB (ratio of BWs) |

Figure 2:
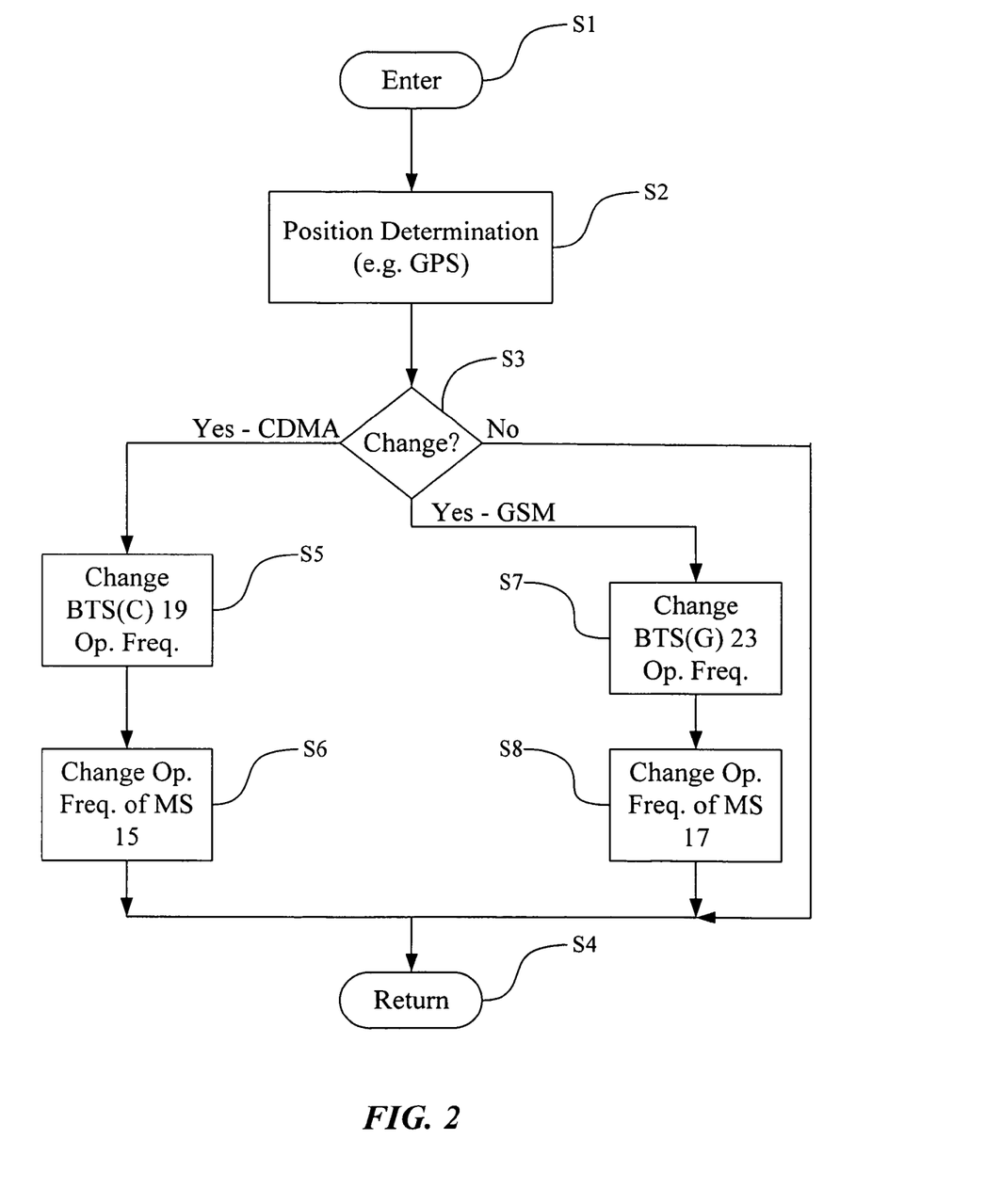
FIG. 2 is a flow chart, illustrating processing steps of a simplified technique for dynamically changing operating frequencies of the pico cell system of FIG. 1 based on position of the airplane.

FIG. 2 depicts a simple example of a sub-routine as might be implemented by the BSC 27 controlling operations of the pico cell system 11, to dynamically change operating frequencies of the pico cell system 11 based on changes of position of the airplane 13, e.g. as the plane 13 moves from region 51 to region 53. Calls in progress for voice or data communications would be handed over to a new frequency band as needed, as part of any dynamic frequency change.

Periodically, the programmed operations of the BSC 27 will enter the frequency control/adjustment subroutine at S1. At S2, the BSC 27 determines the current position of the airplane. For example, the BSC may obtain position data from a GPS or other position tracking system in the airplane 13 or may itself include a GPS tracking system. Based on the determined position of the airplane 13, the BSC decides whether or not a change is necessary with respect to operating frequencies of one or more of the pico cell communications (at S3).

In the simple example, there are three possible outcomes from the determination at S3 as to whether or not a change of operating frequencies is needed. In one case, no change is necessary, and processing flows from S3 to step S4 at which time the processing of the BSC 27 exits the frequency control/adjustment subroutine by returning to other processing operations. The other two outcomes arise when there is a need to change the operating frequency band of one or both of the pico cell services, GSM and/or CDMA.

If a change of the CDMA processing is necessary, typically because the position determination indicates the airplane is crossing a region boundary, processing flows from S3 to step S5. At S5, the BSC 27 controls the BTS(C) 19 for the broadband (CDMA) service to change its operating frequency band. In the region 51, the BTS(C) 19 operated on at least a portion of a frequency band that the terrestrial public network 71 utilized for narrowband GSM service. In the region 53, the terrestrial GSM network utilizes a different band, hence, the BSC 27 causes the BTS(C) 19 to shift its operations to utilize at least a portion of that different frequency band utilized for narrowband GSM service in the region 53. The shift effectively instructs the BTS(C) 19 to switch any ongoing calls to the new frequency band and to set-up any future call for handset(s) 15 on the different frequency band.

The BSC 27 is configured so as to communicate with CDMA and GSM mobile stations 15, 17 operating within the service area inside the airplane to dynamically control transmission power levels and operating frequencies of the mobile stations operating within the indoor service area. Some of these communications may involve specific exchange of signaling messages between the BSC and the mobile stations. In other cases, the BSC causes the base stations to broadcast relevant control information, such as system identification, synchronization and operation frequency information; and the mobile stations detect and use that information in their communications through the pico cell system 11. Hence, in response to the shift in operating frequency by the BTS(C) 19 at S5, the CDMA mobile station(s) 15 within the airplane 13 modify their operations so as to communicate with the CDMA base station on the new frequency band, that is to say on the band utilized for narrowband GSM service in the region 53 in the example. For any station actively involved in a call at the time of the frequency change, this will entail a switch to the newly allocated frequency band.

In some cases, the handsets or other mobile devices operating in the airborne environment may not contain the desired guard band channel assignments in their standard frequency search lists. In such cases, to enable the pico cell operations additional considerations are necessary that include but are not limited to the following: 1) the handsets or devices may need to update their frequency search lists to find certain channels if they are not already in the standard channel search lists; 2) the handsets or devices may need to update their System or Preferred Roaming Lists (PRL), or Public Land Mobile Network (PLMN) list to find certain systems if they are not already in the standard system search lists; 3.) the pico cell may need to operate broadcast (overhead) channels in standard channel assignment spectrum (which are within the normal channel search lists or handsets) that directs handsets and devices on board the aircraft to the desired channels on guard band channels.

In some cases, a shift of one operation band, e.g. only CDMA or only GSM, may be sufficient, depending on the bands used by various services on the ground and/or contractual arrangements with the terrestrial service provider. Change of the band for GSM operation may occur later, on a later pass through the subroutine. In other cases, both broadband and narrowband operations of the pico cell system 11 will change at about the same time. Hence, upon a determination of a need to change frequency (at S3), processing may flow to step S7 (alone or in parallel with execution of the CDMA related change at step S5).

At step S7, the BSC 27 controls the BTS(G) 23 for the narrowband (GSM) service to change its operating frequency band. In the region 51, the BTS(G) 23 operated on a portion of the frequency band that the terrestrial public network 61 utilized for broadband CDMA service. In the region 53, the terrestrial CDMA network utilizes a different band, hence, the BSC 27 causes the BTS(G) 23 to shift its operations to utilize at least a portion of that different frequency band utilized for broadband CDMA service in the region 53. The shift effectively instructs the BTS(G) 23 to switch any ongoing calls to the new frequency band and to set-up any future call for handset(s) 15 on the different frequency band.

In response to the shift in operating frequency by the BTS (G) 23, the GSM mobile station(s) 17 within the airplane 13 modify their operations so as to communicate with the GSM base station on the new frequency band, that is to say on the band utilized for broadband CDMA service in the region 53. For any station actively involved in a call at the time of the frequency change, this will entail a switch to the newly allocated frequency band.

If changes of both operating bands are necessary, the processing to change frequencies on both bands may be performed substantially in parallel, as illustrated. Alternatively, the system may change the operating band for one type of service and then change the operating band for the other type of service. When all necessary frequency changes are successfully completed, processing flows to step S4 at which time the processing of the BSC 27 exits the frequency control/adjustment subroutine by returning to other processing operations.

The BSC 27 of the on-board pico cell system 11 also dynamically controls the transmit power level of each of the handsets 15, 17 operating in the airplane. In an example, the mobile station transmit power level is controlled to a maximum power level of 0 dBm, with a 0 dBi handset antenna gain, resulting in a power of 0 dBm Equivalent Isotropic Radiated Power (EIRP). This is the minimum power level for standard GSM handsets when operating in PCS spectrum. The minimum level for CDMA handsets may be as low as −50 dBm when operating in either a cellular band or a PCS spectrum band. It is noted that the minimum power level for GSM, AMPS, and TDMA handsets operating in cellular spectrum is +5 dBm, +8 dBm, and −4 dBm respectively. Hence, it may be necessary to upgrade some handsets operating on cellular spectrum to meet the 0 dBm level desired, for times when such handsets will operate on cellular spectrum within the indoor area of the airplane 13. Also, for discussion purposes, a 0 dBi mobile antenna gain is assumed, which represents a handset radiated power limit of 0 dBm EIRP.

As shown by the above discussion, many of the functions relating to the control of operation frequencies of the indoor or pico cell system 11 to mitigate interference between wireless communications of that system and public wireless networks 61, 71 operating in over-flown regions 51, 53 may be implemented on computers or other programmable devices connected for control of the BTS transceivers 19, 23 of the system 11. The software functionalities involve programming, including executable code as well as associated stored data, for causing the BSC or other hardware implementing the control functionality to implement the relevant frequency control and/or associated mobile station power control, as exemplified by discussion herein. In operation, the code and possibly the associated data records are stored within the respective hardware platform. At other times, however, the software may be stored at other locations and/or transported for loading into the BSC or other appropriate platform. Hence, the embodiments involve one or more software products in the form of one or more modules of code carried by at least one machine-readable storage medium. Execution of such code by a processor or the like of the BSC or other controller platform enables the programmed device to implement the frequency control for the pico cell system, in essentially the manner performed in the embodiments discussed and illustrated herein.

As used herein, terms such as computer or machine "readable medium" refer to any storage medium that participates in providing instructions to a processor for execution. Such a storage medium may take many forms, including but not limited to, non-volatile storage media, and volatile storage media. Non-volatile storage media include, for example, optical or magnetic disks, such as storage devices in any BSC or computer(s) operating as the controller of the pico cell system. Volatile storage media include dynamic memory, such as main memory of a BSC or other computer platform. Many of these forms of computer readable storage media may be involved in carrying one or more sequences of one or more instructions to a processor of the BSC or other platform for storage and/or execution.

Frequency coordination and spectrum leasing arrangements as outlined herein may permit higher output power levels (i.e. above 0 dBm airborne handset operation) and/or operation at lower altitudes, in cases and areas where terrestrial networks agree and the pico cell system coordinates appropriate frequencies for airborne operation, at most, at the expense of limiting the use of certain channels in the ground networks.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

3rd Generation Partnership Project 2 (3GPP2)
Advanced Mobile Phone Service (AMPS)
Authentication, Authorization and Accounting (AAA)
Base Station (BS)
Base Station Controller (BSC)
Base Transceiver System (BTS)
Code Division Multiple Access (CDMA)
Equivalent Isotropic Radiated Power (EIRP)
Evolution Data Only (EVDO)
General Packet Radio Service (GPRS)
Global Positioning System (GPS)
Global System for Mobile (GSM)
Infrared (IR)
Mobile Station (MS)
Mobile Switching Center (MSC)
Mobile Telephone Switching Office (MTSO)
Packet Data Serving Node (PDSN)
Personal Communication Service (PCS)
Personal Computer (PC)
Personal Digital Assistant (PDA)
Preferred Roaming Lists (PRL)
Public Land Mobile Network (PLMN)
Public Switched Telephone Network (PSTN)
Radio Access Network (RAN)
Radio Frequency (RF)
Time Division Multiple Access (TDMA)
Universal Mobile Telecommunications System (UMTS)

What is claimed is:

1. A method, comprising steps of:
   operating a pico cell system in an interior of a moving vehicle to provide wireless communications in the moving vehicle, in accordance with a first public wireless communication protocol;
   operating the pico cell system in the interior of the moving vehicle to provide wireless communications in the moving vehicle, in accordance with a second public wireless communication protocol different from the first public wireless communication protocol; and
   ameliorating interference between the pico cell system and public wireless communications systems operating in surrounding outdoor regions through or over which the moving vehicle travels, by coordinating frequencies of operation of the pico cell system with frequencies of operation used by the public wireless communications systems in the regions, the step of ameliorating interference comprising:

a) controlling the pico cell system to provide the wireless communication service for one or more mobile devices within the wireless communications in accordance with the first public wireless communication protocol, on a first frequency band corresponding to at least a portion of a frequency band allocated for wireless service via a public mobile communication network operating in a first surrounding outdoor region in accordance with the different second public wireless communication protocol;

b) controlling the pico cell system to provide the wireless communication service for one or more mobile devices within the wireless communications in accordance with the second public wireless communication protocol, on a second frequency band corresponding to at least a portion of a frequency band allocated for wireless service via a public mobile communication network operating in the first surrounding outdoor region in accordance with the first public wireless communication protocol;

c) monitoring position of the vehicle and detecting from that monitoring when the vehicle moves into a different second surrounding region;

d) dynamically changing the first frequency band so as to correspond to at least a portion of a different frequency band allocated for second protocol wireless service via a public mobile communication network operating in the different second surrounding outdoor region, upon detecting movement of the vehicle into the different second surrounding outdoor region; and e) dynamically changing the second frequency band so as to correspond to at least a portion of a different frequency band allocated for first protocol wireless service via a public mobile communication network operating in the different second surrounding outdoor region, upon detecting movement of the vehicle into the different second surrounding outdoor region, wherein:

the pico cell system operating in the interior of the moving vehicle includes at least one base station, the step of dynamically changing the first frequency band so as to correspond to at least the portion of the different frequency band allocated for the second protocol wireless service includes dynamically changing the first frequency band on which the at least one base station provides services for a first plurality of mobile devices to the different frequency band allocated for the second protocol wireless service, thereby enabling the at least one base station to provide the services to the first plurality of mobile devices on the different frequency band allocated for the second protocol wireless service, and the step of dynamically changing the second frequency band so as to correspond to at least the portion of the different frequency band allocated for the first protocol wireless services includes dynamically changing the second frequency band on which the at least one base station provides services for a second plurality of mobile devices to the different frequency band allocated for the first protocol wireless services, thereby enabling the at least one base station to provide the services to the second plurality of mobile devices on the different frequency band allocated for the first protocol wireless service.

2. The method of claim 1, wherein:
the wireless communications service provided in accordance with the first public wireless communication protocol is a narrowband wireless communication service;
the frequency bands allocated for second protocol wireless service via public mobile communication networks in the first and second outdoor regions are bands allocated for broadband wireless service in accordance with the second public wireless communication protocol in the surrounding outdoor region;
the wireless communications service provided in accordance with the second public wireless communication protocol is a broadband wireless communication service; and
the frequency bands allocated for first protocol wireless service via public mobile communication networks in the first and second outdoor regions are bands allocated for narrowband wireless service in accordance with the first wireless communication protocol in the surrounding outdoor region.

3. The method of claim 2, wherein steps (a) and (d) cause the pico cell system to operate to provide service in accordance with the first wireless communication protocol on frequency bands corresponding to guard band portions of the frequency bands allocated for mobile wireless communication in accordance with the second public wireless communication protocol in the first and second surrounding outdoor regions, respectively.

4. The method of claim 2, wherein:
the narrowband wireless service provided in accordance with the first public wireless communication protocol is a Global System for Mobile (GSM) service; and
the broadband wireless service provided in accordance with the second public wireless communication protocol is a code division multiple access (CDMA) service.

5. The method of claim 1, wherein:
the wireless communications service provided in accordance with the first public wireless communication protocol is a broadband wireless communication service;
the frequency bands allocated for second protocol wireless service via public mobile communication networks in the first and second outdoor regions are bands allocated for narrowband wireless service in accordance with the second public wireless communication protocol in the surrounding outdoor region;
the wireless communications service provided in accordance with the second public wireless communication protocol is a narrowband wireless communication service; and
the frequency bands allocated for first protocol wireless service via public mobile communication networks in the first and second outdoor regions are bands allocated for broadband wireless service in accordance with the first wireless communication protocol in the surrounding outdoor region.

6. The method of claim 1, wherein the moving vehicle is an aircraft.

7. A pico cell system for use in an interior of a moving vehicle to provide wireless communications in the moving vehicle, the pico cell system comprising:
one or more base stations configured for communication with mobile stations in accordance with different first and second public wireless communication protocols respectively, within the interior of the moving vehicle;
a base station controller for controlling wireless operations of the one or more base stations; and a communication interface coupled to the one or more base stations for providing two-way communications to and from a public communication network, wherein the base station controller is configured to control operations of the one or more base stations so as to ameliorate interference between the pico cell system and public wireless communications systems operating in surrounding outdoor regions through or over which the moving vehicle travels, by coordinating frequencies of operation of the pico cell system with frequencies of operation used by the public wireless communications systems in the regions, the amelioration of interference comprising functions of:

a) controlling the pico cell system to provide the wireless communication service for one or more mobile devices within the wireless communications in accordance with the first public wireless communication protocol, on a first frequency band corresponding to at least a portion of a frequency band allocated for wireless service via a public mobile communication network operating in a first surrounding outdoor region in accordance with the different second public wireless communication protocol;

b) controlling the pico cell system to provide the wireless communication service for one or more mobile devices within the wireless communications in accordance with the second public wireless communication protocol, on a second frequency band corresponding to at least a portion of a frequency band allocated for wireless service via a public mobile communication network operating in the first surrounding outdoor region in accordance with the first public wireless communication protocol;

c) monitoring position of the vehicle and detecting from that monitoring when the vehicle moves into a different second surrounding region;

d) dynamically changing the first frequency band so as to correspond to at least a portion of a different frequency band allocated for second protocol wireless service via a public mobile communication network operating in the different second surrounding outdoor region, upon detecting movement of the vehicle into the different second surrounding outdoor region; and e) dynamically changing the second frequency band so as to correspond to at least a portion of a different frequency band allocated for first protocol wireless service via a public mobile communication network operating in the different second surrounding outdoor region, upon detecting movement of the vehicle into the different second surrounding outdoor region, wherein:

the base station controller function of dynamically changing the first frequency band comprises controlling one or more base stations to dynamically change the first frequency band to correspond to at least the portion of the different frequency band allocated for the second protocol wireless service, thereby enabling the one or more base stations to provide the services to a first plurality of mobile devices on the different frequency band allocated for the second protocol wireless service, and the base station controller function of dynamically changing the second frequency band comprises controlling one or more base stations to dynamically change the second frequency band to at least the portion of the different frequency band allocated for the first protocol wireless service, thereby enabling the one or more base stations to provide the services to a second plurality of mobile devices on the different frequency band allocated for the first protocol wireless service.

8. The pico cell system of claim 7, wherein:

the one or more base stations provide the wireless communications service in accordance with the first public wireless communication protocol as a narrowband wireless communication service;

the frequency bands allocated for second protocol wireless service via public mobile communication networks in the first and second outdoor regions are bands allocated for broadband wireless service in accordance with the second public wireless communication protocol in the surrounding outdoor region;

the one or more base stations provide the wireless communications service in accordance with the second public wireless communication protocol as a broadband wireless communication service; and the frequency bands allocated for first protocol wireless service via public mobile communication networks in the first and second outdoor regions are bands allocated for narrowband wireless service in accordance with the first wireless communication protocol in the surrounding outdoor region.

9. The pico cell system of claim 8, the amelioration functions (a) and (d) cause the pico cell system to operate to provide service in accordance with the first wireless communication protocol on frequency bands corresponding to guard band portions of the frequency bands allocated for mobile wireless communication in accordance with the second public wireless communication protocol in the first and second surrounding outdoor regions, respectively.

10. The pico cell system of claim 9, wherein the one or more base stations provide Global System for Mobile (GSM) type narrowband communication service within the indoor service area and provide code division multiple access (CDMA) type broadband communication service within the indoor service area.

11. The pico cell system of claim 7, wherein:

the one or more base stations provide the wireless communications service in accordance with the first public wireless communication protocol as a broadband wireless communication service;

the frequency bands allocated for second protocol wireless service via public mobile communication networks in the first and second outdoor regions are bands allocated for narrowband wireless service in accordance with the second public wireless communication protocol in the surrounding outdoor region;

the one or more base stations provide the wireless communications service in accordance with the second public wireless communication protocol as a narrowband wireless communication service; and the frequency bands allocated for first protocol wireless service via public mobile communication networks in the first and second outdoor regions are bands allocated for broadband wireless service in accordance with the first wireless communication protocol in the surrounding outdoor region.

12. The pico cell system of claim 7, wherein the pico cell system is configured for use in an aircraft as the moving vehicle.

13. A program product comprising a non-transitory machine readable medium and executable code embodied on the medium, wherein execution of the code by a programmable controller of a pico cell system operating in an interior of a moving vehicle will cause the controller to control operations of the pico cell system to provide wireless communications for narrowband and broadband mobile stations in the interior of the moving vehicle, the controlled operations including steps comprising:

operating a pico cell system in the interior of the moving vehicle to provide wireless communications in the moving vehicle, in accordance with a first public wireless communication protocol;

operating the pico cell system in the interior of the moving vehicle to provide wireless communications in the moving vehicle, in accordance with a second public wireless communication protocol different from the first public wireless communication protocol; and ameliorating interference between the pico cell system and public wireless communications systems operating in surrounding outdoor regions through or over which the moving vehicle travels, by coordinating frequencies of operation of the pico cell system with frequencies of operation used by the public wireless communications systems in the regions, the step of ameliorating interference comprising:

a) controlling the pico cell system to provide the wireless communication service for one or more mobile devices within the wireless communications in accordance with the first public wireless communication protocol, on a first frequency band corresponding to at least a portion of a frequency band allocated for wireless service via a public mobile communication network operating in a first surrounding outdoor region in accordance with the different second public wireless communication protocol;

b) controlling the pico cell system to provide the wireless communication service for one or more mobile devices within the wireless communications in accordance with the second public wireless communication protocol, on a second frequency band corresponding to at least a portion of a frequency band allocated for wireless service via a public mobile communication network operating in the first surrounding outdoor region in accordance with the first public wireless communication protocol;

c) monitoring position of the vehicle and detecting from that monitoring when the vehicle moves into a different second surrounding region;

d) dynamically changing the first frequency band so as to correspond to at least a portion of a different frequency band allocated for second protocol wireless service via a public mobile communication network operating in the different second surrounding outdoor region, upon detecting movement of the vehicle into the different second surrounding outdoor region; and e) dynamically changing the second frequency band so as to correspond to at least a portion of a different frequency band allocated for first protocol wireless service via a public mobile communication network operating in the different second surrounding outdoor region, upon detecting movement of the vehicle into the different second surrounding outdoor region, wherein:

the pico cell system includes at least one base station, dynamically changing the first frequency band so as to correspond to at least the portion of the different frequency band allocated for the second protocol wireless service includes dynamically changing the first frequency band on which the at least one base station provides services for a first plurality of mobile devices to the different frequency band allocated for the second protocol wireless service, thereby enabling the at least one base station to provide the services to the first plurality of mobile devices on the different frequency band allocated for the second protocol wireless service, and dynamically changing the second frequency band so as to correspond to at least the portion of the different frequency band allocated for the first protocol wireless services includes dynamically changing the second frequency band on which the at least one base station provides services for a second plurality of mobile devices to the different frequency band allocated for the first protocol wireless services, thereby enabling the at least one base station to provide the services to the second plurality of mobile devices on the different frequency band allocated for the first protocol wireless service.

14. The product of claim 13, wherein:
the wireless communications service provided in accordance with the first public wireless communication protocol is a narrowband wireless communication service;
the frequency bands allocated for second protocol wireless service via public mobile communication networks in the first and second outdoor regions are bands allocated for broadband wireless service in accordance with the second public wireless communication protocol in the surrounding outdoor region;
the wireless communications service provided in accordance with the second public wireless communication protocol is a broadband wireless communication service; and
the frequency bands allocated for first protocol wireless service via public mobile communication networks in the first and second outdoor regions are bands allocated for narrowband wireless service in accordance with the first wireless communication protocol in the surrounding outdoor region.

15. The product of claim 14, wherein steps (a) and (d) cause the pico cell system to operate to provide service in accordance with the first wireless communication protocol on frequency bands corresponding to guard band portions of the frequency bands allocated for mobile wireless communication in accordance with the second public wireless communication protocol in the first and second surrounding outdoor regions, respectively.

16. The product of claim 15, wherein:
the narrowband wireless service provided in accordance with the first public wireless communication protocol is a Global System for Mobile (GSM) service; and
the broadband wireless service provided in accordance with the second public wireless communication protocol is a code division multiple access (CDMA) service.

17. The product of claim 13, wherein:
the wireless communications service provided in accordance with the first public wireless communication protocol is a broadband wireless communication service;
the frequency bands allocated for second protocol wireless service via public mobile communication networks in the first and second outdoor regions are bands allocated for narrowband wireless service in accordance with the second public wireless communication protocol in the surrounding outdoor region;
the wireless communications service provided in accordance with the second public wireless communication protocol is a narrowband wireless communication service; and
the frequency bands allocated for first protocol wireless service via public mobile communication networks in the first and second outdoor regions are bands allocated for broadband wireless service in accordance with the first wireless communication protocol in the surrounding outdoor region.

* * * * *